United States Patent
Nikolajevic et al.

(10) Patent No.: US 10,062,293 B2
(45) Date of Patent: Aug. 28, 2018

(54) SAFETY SYSTEM, A HELICOPTER FITTED WITH SUCH A SYSTEM, AND A SAFETY METHOD SEEKING TO AVOID AN UNDESIRABLE EVENT

(71) Applicant: AIRBUS HELICOPTERS, Marignane (FR)

(72) Inventors: Konstanca Nikolajevic, Marseilles (FR); Nicolas Belanger, Fos sur Mer (FR); Nicolas Damiani, Marseilles (FR); Arnaud Violette, Vitrolles (FR)

(73) Assignee: Airbus Helicopters, Marignane (FR)

( * ) Notice: Subject to any disclaimer, the term of this patent is extended or adjusted under 35 U.S.C. 154(b) by 133 days.

(21) Appl. No.: 15/008,780

(22) Filed: Jan. 28, 2016

(65) Prior Publication Data
US 2016/0225269 A1 Aug. 4, 2016

(30) Foreign Application Priority Data
Jan. 29, 2015 (FR) ...................... 15 00167

(51) Int. Cl.
*G08G 5/04* (2006.01)
*G05D 1/00* (2006.01)
(Continued)

(52) U.S. Cl.
CPC ............. *G08G 5/045* (2013.01); *B64C 27/04* (2013.01); *B64D 45/04* (2013.01); *G05D 1/0061* (2013.01);
(Continued)

(58) Field of Classification Search
CPC ...... G08G 5/045; G08G 5/003; G08G 5/0086; G08G 5/0078; G08G 5/0021; B64C 27/04; B64D 45/04; G05D 1/0061; G05D 1/101
See application file for complete search history.

(56) References Cited

U.S. PATENT DOCUMENTS 6,940,426 B1 9/2005 Vaida
7,295,134 B2 * 11/2007 Jourdan ............... G05D 1/0607
340/309.16
(Continued)

FOREIGN PATENT DOCUMENTS

EP 0790487 A2 8/1997
EP 0790487 A3 9/1998
(Continued)

OTHER PUBLICATIONS

Federal Aviation Administration Techical Standard Order TSO-C151b; Dec. 17, 2002.*
(Continued)

*Primary Examiner* — Alan D Hutchinson
(74) *Attorney, Agent, or Firm* — Brooks Kushman P.C.

(57) ABSTRACT

A safety system seeking to avoid an undesirable event while piloting a helicopter. According to the invention, the system is remarkable in that it comprises a computer making it possible at any instant $t$ to generate a three-dimensional envelope of fallback paths for the helicopter, the envelope being obtained by calculating, at the instant $t$, a set of positions that can be reached by the helicopter during a predetermined flight duration, the computer having parameters previously set with data relating to the flight capabilities of the helicopter and including at least one of the following capabilities: maximum speeds and accelerations in all three spatial directions, minimum turning radii for yaw, nose-down, and/or nose-up movements, maximum weight of the transported load, and maximum stresses.

20 Claims, 1 Drawing Sheet

(51) Int. Cl.
  *G05D 1/10*    (2006.01)
  *G08G 5/00*    (2006.01)
  *B64C 27/04*   (2006.01)
  *B64D 45/04*   (2006.01)
(52) U.S. Cl.
  CPC ............ *G05D 1/101* (2013.01); *G08G 5/003* (2013.01); *G08G 5/0021* (2013.01); *G08G 5/0078* (2013.01); *G08G 5/0086* (2013.01)

(56) References Cited

U.S. PATENT DOCUMENTS

| | | |
|---|---|---|
| 7,962,254 B2 | 6/2011 | Bouchet et al. |
| 2002/0055809 A1 | 5/2002 | Westphal |
| 2006/0158350 A1 | 7/2006 | Glover |
| 2010/0286851 A1* | 11/2010 | Ishihara ............... G01C 23/005 701/9 |

FOREIGN PATENT DOCUMENTS

| | | |
|---|---|---|
| EP | 1369665 A2 | 12/2003 |
| EP | 1517211 | 3/2005 |
| EP | 1369665 A3 | 5/2007 |
| EP | 1832850 | 9/2007 |
| EP | 1891618 | 10/2008 |

OTHER PUBLICATIONS

Wikipedia article Center of Gravity of an aircraft; Oct. 28, 2014.*
French Search Report for French Application No. FR 1500167, Completed by the French Patent Office on Dec. 2, 2015, 8 Pages.

* cited by examiner

SAFETY SYSTEM, A HELICOPTER FITTED WITH SUCH A SYSTEM, AND A SAFETY METHOD SEEKING TO AVOID AN UNDESIRABLE EVENT

CROSS REFERENCE TO RELATED APPLICATION

This application claims priority to French patent application No. FR 15 00167 filed on Jan. 29, 2015, the disclosure of which is incorporated in its entirety by reference herein.

BACKGROUND OF THE INVENTION (1) Field of the Invention

The present invention relates to the field of aviation and to providing assistance in the piloting of a rotary wing aircraft such as a helicopter. The invention relates more particularly to a safety system seeking to avoid an undesirable event such as colliding with the outside environment, and it is based on observing a reduction in the spread of paths available for a helicopter as a function of time. A helicopter fitted with such a safety system is safer since it makes it possible to limit the risks of an accident. In addition, such a helicopter can be remotely piloted, e.g. a drone, or it may carry a pilot and/or a crew.

The invention also relates to a method of limiting the risk of an accident during a helicopter flight, and when, unfortunately, a collision with terrain in relief or an obstacle cannot be avoided, such a method can serve to limit the consequences of such an accident.

(2) Description of Related Art

In general manner, known safety systems and methods for applications of this type do no more than evaluate a risk by making use of a database storing data associated with previous accidents. One such system is described in particular in Document U.S. Pat. No. 6,940,426.

Nevertheless, that type of safety system is ineffective when an undesirable event arises that is not listed in the database. Furthermore, undesirable events are often complex since they are the result of a string of several undesirable events contributing to degrading the current flight situation, or indeed in the worst case, leading to an accident of the helicopter. Unfortunately, it is not possible to identify and list all effects that might be produced by the various possible combinations of undesirable events leading up to an accident.

A first object of the invention is thus to provide a solution that is simple, reliable, and effective for identifying a risk of an accident and for attempting to avoid the accident.

Furthermore, as described in Document US 2002/0055809, it is also known to use the principle of fuzzy logic for evaluating risks that are a function of the current flight situation. Nevertheless, under such circumstances, the paths for avoiding the risk are standard predicted paths, i.e. paths that are already stored in a memory. Furthermore, those paths are followed while conserving the current speed of the helicopter and, under such circumstances, that can increase the risk of an accident, and in any event can fail to limit its consequences.

Likewise, and as described in Document EP 1 891 618, a method and a system for providing assistance in piloting a military transport airplane are known that make it possible automatically to follow an avoidance path on detecting a ground-air threat.

Nevertheless, under those circumstances, the avoidance paths are lateral paths at low altitude presenting at least one lateral turn and at least one limit slope in order to follow an avoidance path departing as much as possible from the initial path. Furthermore, the set of fallback paths for such an airplane is thus limited and does not require an advanced computer.

Thus, Document EP 1 891 618 does not disclose a system comprising a specific computer for generating a three-dimensional envelope of fallback paths, where the envelope is defined as being the set of positions that can be reached by a helicopter, and thus being much more complex and larger than the set of positions that can be reached by an airplane. Under no circumstances can such a computer propose fallback paths e.g. involving portions that are vertical and/or involving paths with braking, and at least paths without any lateral turning.

Likewise, Documents EP 1 369 665, EP 0 790 487, EP 1 517 211, US 2006/158350, and EP 1 832 850 describe various methods and systems for assisting the piloting of aircraft flying at low altitude in order to avoid collisions between an aircraft and the terrain over which it is flying. Those methods and systems then also make it possible to modify the flight path of an airplane automatically when an obstacle, such as a mountain, is identified on the current path of the airplane.

Nevertheless, none of the Documents EP 1 369 665, EP 0 790 487, EP 1 517 211, US 2006/158350, and EP 1 832 850 describes a safety system comprising simultaneously a specific computer as described above, an emergency member for warning that the number of fallback paths for the helicopter has decreased, and a control member for undertaking corrective piloting actions when the number of fallback paths drops even more.

BRIEF SUMMARY OF THE INVENTION

An object of the present invention is thus to propose a safety system making it possible to avoid the above-mentioned limitations, in which the system and the corresponding method make it possible to improve the safety of a helicopter confronted with one or more undesirable events in combination. Furthermore, in the event that it is not possible to avoid an accident, the safety system makes it possible to limit the consequences of the accident, e.g. by following a fallback path in which the speed of the helicopter is varied.

The invention thus provides a safety system seeking to avoid an undesirable event while piloting a helicopter. According to the invention, the safety system is remarkable in that it comprises:

a computer making it possible at any instant $t$ to generate a three-dimensional envelope of fallback paths for the helicopter, such an envelope being obtained by calculating, at the instant $t$, a set of positions that can be reached by the helicopter during a predetermined flight duration, the computer having parameters previously set with data relating to the flight capabilities of the helicopter and including at least one of the following capabilities: maximum speeds and accelerations in all three spatial directions, higher order derivatives of at least one of the maximum speeds or accelerations in all three spatial directions, minimum turning radii for yaw movements, climbing or descending angles, maximum weight of the transported load, and maximum stresses;

an emergency member suitable for issuing a warning signal when the number of fallback paths is less than a first threshold value; and a control member suitable, when the number of fallback paths is less than a second threshold value, for implementing corrective helicopter piloting actions in order to minimize the consequences of the helicopter suffering an accident.

In other words, such a computer acts in real time to diagnose the safety of the flight situation and to provide a set of paths that are appropriate for that situation. The safety diagnosis also relies on analyzing the maneuvering capabilities of the helicopter in the environment in which it is flying, and this is done while taking account of the terrain in relief, and of stationary obstacles and of moving obstacles.

The safety computer thus continuously generates a set of paths that can be followed by the helicopter given its dynamic capabilities, i.e. it scans through three-dimensional space starting from the current position of the helicopter.

Thus, the dynamic properties of the helicopter are applied in the same manner to all paths for the helicopter in any direction in three-dimensional space. This produces a bundle of paths associated with parameters as a function of the dynamic stresses they involve. Specifically, the computer can generate both paths that involve little dynamic stress and paths that subject the helicopter to high levels of dynamic stress.

An algorithm for extrapolating paths then generates the set of paths of moving obstacles as a function of their previous movements by analyzing data relating to their positions, their orientations, their speeds, and their accelerations.

Thereafter the system extracts from the set of paths that can be followed, those that do not enter into collision with the terrain nor with stationary obstacles, nor with moving obstacles. This produces the set of paths Tr that can be followed by the helicopter at instant $\underline{t}$.

Furthermore, using an emergency member, such a safety system, makes it possible to perform actions seeking to help emergency services reach the site of an accident quickly. Such actions may also consist in automatically transmitting flight data to emergency services, with this being done prior to impact against the terrain or an obstacle. By way of example, such flight data may comprise latitude and longitude coordinates obtained from a GPS module, or indeed the speed and the direction of flight.

Furthermore, the first threshold value used for triggering the warning signal advantageously lies in the range 10 to 100 fallback paths. This first threshold value may be constant, or else, in certain situations, it may be variable, e.g. as a function of the rate at which the number of fallback paths is decreasing. Thus, when the rate of decrease is fast, then the first threshold value may advantageously be high. On the contrary, when the rate of decrease is slow, then the first threshold value may be low.

Finally, additionally making use of a control member means that such a safety system enables actions to be performed that seek to reduce the energy of an impact as transmitted to the crew and the pilot in the event of a crash. For this purpose, the safety computer identifies the moment at which an impact becomes inevitable. As from that instant, the control member receives instructions from the computer and then performs actions seeking to diminish the consequences of the impact. For example, the control member of the safety system may undertake emergency deceleration, pull up the nose, or perform any other maneuver suitable for reducing the consequences of an impact with the ground or a platform.

Naturally, such a second threshold value may be equal to or different from the first threshold value used for triggering the warning signal.

Advantageously, the fallback paths may belong to at least two groups of paths corresponding to two distinct safety levels as pre-set by the pilot before a mission.

In other words, a bundle is obtained that is made up of at least two distinct paths associated with parameters as a function of the dynamic stresses they involve.

In practice, the computer may identify at least one preferred fallback path from the three-dimensional envelope of fallback paths, and the safety system may include a man-machine interface enabling the pilot to select the preferred fallback path.

Thus, the safety system is suitable for selecting a path from the bundle of paths as a function of targets that are set in advance, such as in particular a dynamic stress limit of the helicopter, proximity to terrain in relief or to obstacles, a limit on changing direction over a short period of time, and departure from the initial route.

These paths may be transmitted directly to the pilot via the man-machine interface, and they may be associated with respective scores that are calculated on the basis of complying with the targets defined in advance. The path having the best score is then displayed first, e.g. on a screen. This preferred path may also be transmitted to the autopilot so as to enable it to be used automatically in an emergency.

In another embodiment, the man-machine interface may also serve to guide path selections or to make proposals for selecting paths as a function of path preference criteria.

Furthermore, the safety computer thus has the ability to make a safety diagnosis as a function of the proximity of the danger. The objective and formal calculation performed by the computer makes it possible to estimate the closeness and the imminence of the danger on a safety scale that is based in particular on: the reduction in the number Tr of fallback paths or indeed its derivative corresponding to the rate at which the number of fallback paths is decreasing, increases in the minimum levels of dynamic stress needed to avoid an accident, and/or the observable distance to the obstacle/terrain along the paths that are achievable.

As mentioned above, the invention also provides a helicopter that is remarkable in that it includes a safety system as described above.

Such a helicopter may in particular be in the form of a helicopter with a crew on board, but that is not essential. The helicopter of the invention could also be remotely controlled, i.e. its pilot or its crew is/are at a distance therefrom.

Finally, the invention also provides a safety method seeking to avoid an undesirable event while piloting a helicopter. According to the invention, this method is remarkable in that it comprises at least the steps consisting in:

before a mission of the helicopter, setting parameters of a computer with data relating to the flight capabilities of the helicopter and including at least one of the following capabilities: maximum speeds and/or accelerations in all three spatial directions, higher order derivatives of at least one of the maximum speeds or accelerations in all three spatial directions, minimum turning radii for yaw movements, climbing or descending angles, maximum weight of the transported load, and maximum stresses;

calculating and generating, at any instant $\underline{t}$, a three-dimensional envelope of fallback paths for the helicopter, the envelope being obtained by calculating, at the instant $\underline{t}$, a set of positions that can be reached by the helicopter during a predetermined flight duration;

counting the fallback paths of the helicopter and determining that an undesirable event is imminent when the number of fallback paths drops below a third predetermined threshold value; and issuing a warning signal when the number of fallback paths is less than a first threshold value; and when the number of fallback paths is zero, the method comprises the steps consisting in:

inhibiting piloting commands from a manual and/or automatic piloting member of the helicopter; and generating and transmitting new helicopter piloting commands, the new piloting commands serving to perform corrective actions in order to minimize the consequences of the helicopter suffering an accident.

In other words, at each point of a flight during a mission, the method generates a set of candidate fallback paths in all spatial directions and with various stress levels. A stress level corresponds to the constraints imposed on the flight capabilities of the helicopter by performing a maneuver.

For example, when a path involves climbing in order to avoid an obstacle, the pilot may decide to climb progressively without "forcing" on the flight controls, since the obstacle is far enough away. Alternatively, the pilot may choose to stress the flight capabilities to the maximum in order to climb more quickly, since the pilot estimates that the obstacle is too close to be avoided in progressive manner. Thus, the safety method is capable of distinguishing between those two situations.

The set of calculated fallback paths represents projecting the positions that can be reached by the helicopter into a defined region of space. For example, this region may correspond to a flight duration of 30 seconds (s). Thus, the set of fallback paths generated for 30 s of flight represents the discretized environment of positions reachable by the helicopter in the next 30 s of flight. The risk diagnosis is based initially on the feasibility of the calculated paths, i.e. those that do not lead to a collision with the terrain or with stationary or moving obstacles.

Furthermore, each path corresponds to at least one curve described by the helicopter and calculated relative to its own reference frame. Each path is constituted by a succession of positions in three-dimensional space that can be reached by the helicopter. This set of paths is then analyzed, filtered, and finally weighted, in order to be sorted and made available to the crew as an emergency avoidance maneuver. The object of such a maneuver is to make safe the helicopter and its crew. By analogy, an avoidance maneuver serves to reduce the current risk of the mission.

Furthermore, detecting a sudden drop in the number of paths in the set or of the number of paths in a subset makes it possible to identify an undesirable event and to issue warnings to the pilot of the helicopter.

As before, this third threshold value may be selected to be equal to or different from the first and/or the second threshold values as described above.

Furthermore, and as mentioned above, by issuing a warning signal, it is possible to warn emergency services that an accident is about to take place a few instants before the impact. The emergency services are thus certain to receive information about the position of the helicopter before it becomes damaged by a crash. Such a method ensures the integrity of the locating system installed on board the helicopter at the time the warning signal is sent. In the event of an accident, it is entirely likely that the global positioning system (GPS) module of the helicopter is damaged and becomes inoperative, thus making a search for bringing assistance to the crew, or merely for recovering the remains of the helicopter if it is drone, much more complex and lengthy.

Finally, when the number of fallback paths becomes zero, it is possible, for example, to implement a sudden drop in speed, or indeed to follow a climbing or descending path by causing the helicopter's nose to be moved up or down. Such a method is thus also remarkable in that it includes a step enabling the helicopter to be controlled to follow a path when there is no longer any other alternative.

In practice, it is possible to generate the fallback paths so that they belong to at least two groups of paths corresponding to two distinct safety levels pre-set by the pilot before a mission.

For example, the first group of fallback paths may correspond to paths that are safe since they stress the lift or structural members of the helicopter little. The second group may correspond to paths that are risky since they stress the lift or structural members of the helicopter more strongly.

Naturally, intermediate groups of fallback paths may also be determined between the first and second groups in order to form the entire three-dimensional envelope of fallback paths.

In a particular implementation, the method may include the steps consisting in:

identifying at least one preferred fallback path within the three-dimensional envelope of fallback paths; and using a man-machine interface to give the pilot the option of selecting the preferred fallback path when an undesirable event is detected.

Thus, the paths are associated with respective scores calculated on the basis of complying with targets that were predetermined before the mission. The fallback path having the best score is considered as being the preferred fallback path and it is the first to be displayed on the man-machine interface. The advantage of the safety computer lies in its ability to establish a diagnosis as a function of the proximity of the danger.

Naturally, the man-machine interface may be in various forms such as a screen incorporated in a helmet visor, an electronic device having a touch screen, or indeed a three-dimensional holographic projection suitable for enabling a path to be displayed and manually selected in three dimensions.

Advantageously, in the absence of the pilot of the helicopter selecting the preferred fallback path, the method may include a step consisting in automatically following the preferred fallback path.

In this way, in the event of some emergencies, the preferred fallback path may also be transmitted directly to the autopilot in order to avoid any imminent obstacle. Under such circumstances, the preferred path is automatically followed without requiring the helicopter pilot to select it.

In practice, prior to a helicopter mission, the safety method may include a step consisting in supplying a computer with parameters specific to the flight conditions of the helicopter, the parameters being selected from the group comprising in particular the weight of the load transported by the helicopter, the position of its center of gravity, and its flight endurance.

In other words, the pilot can set the computer so that it generates the envelope of fallback paths as a function of parameters such as, for example: the dynamic stress limit of the helicopter, the minimum distance between the helicopter and the terrain, the acceleration limit when changing direction over a short period of time, and the departure from the initial path.

In an advantageous implementation, prior to a helicopter mission, the safety method may include a step consisting in transmitting piloting preferences to a computer for use in the situation in which the undesirable event has been identified, the preferences being selected from the group comprising in particular the dynamic stress limit of the helicopter, proximity to terrain in relief and/or to stationary or moving obstacles, the limit on changes of direction in a short period of time, and departure from an initial route.

The computer is set by the crew in advance so as to enable fallback paths to be displayed on the man-machine interface in compliance with predetermined display preferences. For example, the pilot may prefer to display paths that stress the helicopter little, or indeed paths that comply with some minimum distance relative to the ground. Naturally, such display preferences coming from the pilot or the crew may also be modified during a mission.

Obtaining an image of fallback paths usable by the helicopter in the short term, and doing so in real time, constitutes a considerable advantage. Not only can the crew visualize various fallback paths as alternatives to the current flight path, but such an avionics function also makes it possible at each stage of a flight to quantify the current risk as a function of the helicopter's own capabilities without departing from its flight envelope and complying with the flight preferences of the crew in terms of safety, flight comfort, and the characteristics of missions.

Furthermore, in order to handle an undesirable event and select an appropriate fallback path, it is necessary to have constant knowledge of the outside environment around the helicopter such as the relief of the terrain, danger zones, and stationary or moving obstacles such as other helicopters, for example. For this purpose, several techniques may be used independently or in combination.

Thus, in a first implementation, the method may include a step of transmitting data to a computer, which data comes from a sensor suitable for reconstituting a three-dimensional image of the outside environment.

Under such circumstances, the sensor serves to probe the terrain in order to determine the presence of a stationary or moving obstacle. Such a sensor may be of various kinds, and in particular it may be in the form of a radar on board the helicopter.

In a second implementation, the method may include a step of transmitting data to a computer, which data comes from a database stored in a memory, the data consisting in a three-dimensional map of the outside environment.

In this other situation, information about the outside environment is thus previously stored in the memory and can be consulted at any time by the computer.

Naturally, it is also possible in a third implementation to envisage combining the two implementations described above. In this way, new stationary obstacles, i.e. not on the map, or indeed moving obstacles such as aircraft, can be avoided by means of a sensor. Under such circumstances, the computer receives both information from the memory and information about the immediate environment of the helicopter as generated by the sensor.

BRIEF DESCRIPTION OF THE SEVERAL VIEWS OF THE DRAWINGS

The invention and its advantages appear in greater detail in the context of the following device of examples given by way of illustration and with reference to the accompanying figures, in which.

DETAILED DESCRIPTION OF THE INVENTION

Figure 1:
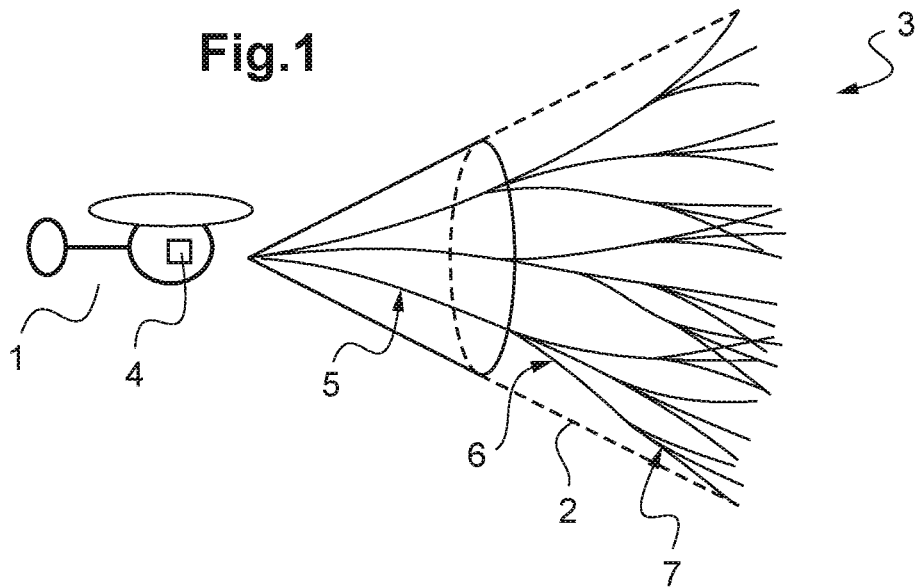
FIG. 1 is a diagrammatic representation of an envelope of fallback paths for a helicopter in accordance with the invention.

As mentioned above, the invention relates to a safety system for avoiding an undesirable event. It also relates to a computer generating a three-dimensional envelope of fallback paths corresponding to all of the paths that can be followed by the helicopter. Such an envelope is shown diagrammatically in two dimensions in FIG. 1.

The system and the corresponding avoidance method thus make it possible to represent an environment that the helicopter can reach during a predetermined flight duration. All of the reachable solutions thus begin on the left in FIG. 1 at a current position of the helicopter. The envelope 2 of fallback paths 3 is generated as a function of data received in real time by the decision-making and/or control members. Thus, a physical projection is formed of future positions that can be reached by the helicopter 1. This makes it possible to anticipate and to determine instantly whether the calculated paths are possible. It is thus certain that an alternative safety maneuver can be selected at any time.

Furthermore, such a system or method makes it possible to provide a plurality of potential types of fallback paths 3, such as in particular avoidance paths in a plane. Such paths may thus lie in a horizontal plane, such as for example a roll movement command (referred to more simply as a roll command), or in a vertical plane, such as for example a climbing path.

Avoidance paths can also follow a curve in three dimensions. The curve is then not contained in a plane. Typically, such paths combine both a climb command and a roll command.

A representation of the position that can be reached by the helicopter 1 following various types of path presents the advantage of enabling a multidirectional representation of possible paths to be constructed. It is thus possible to envisage changes of direction even while following a given fallback path.

For example, in the short term, such as in a duration of 20 s to 30 s, a helicopter 1 can in succession turn in roll along a segment 5 in the horizontal plane, and then in a second segment 6 it can climb vertically, and finally in a third segment 7 it can combine climbing and turning in the opposite direction to the turn in the first segment 5. Thus, in order to be representative of these various possible situations, a fallback path 3 as described above can be resolved into a plurality of independent segments 5, 6, and 7 that are connected together by transitions.

In a first variant of the invention, the segments 5, 6, and 7 of each path 3 can be calculated by primitives that are representative of the dynamic capabilities of the helicopter. These primitives are mathematical curves such as circular arcs, clothoid arcs, straight lines, helical arcs, helicoidal transitions, or indeed generalized Euler spirals, for example. The fallback paths are then calculated while complying with curvature, twist, and climb angle characteristics and as a function of their respective derivatives so as to avoid moving out from the flight envelope.

In a second variant of the invention, the paths may also be constructed by introducing various control relationships and by calculating the consecutive positions by using a dynamic model.

As mentioned above, two consecutive segments do not necessarily have the same curvature, the same direction, or the same twist value.

Consideration is also given to paths in which rapid acceleration/deceleration occurs over at least a portion of the fallback path. Combining segments then makes it possible to perform pertinent spatial discretization. Thus, finding a path that dodges through chaotic terrain in relief becomes more probable.

By way of example, the helicopter can thus be more suitable for flying through a mountainous or hilly region during a mission involving public transport of passengers or during a tactical flight.

Figure 2:
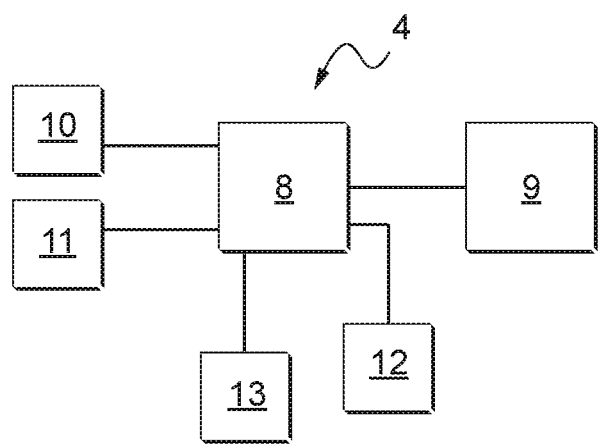
FIG. 2 is a block diagram of a safety system in accordance with the invention.

As shown in FIG. 2, the safety system 4 comprises a computer 8 for generating the envelope 2 of fallback paths 3. Such a computer makes it possible in particular to perform a safety method seeking to avoid an undesirable event while piloting the helicopter 1. Specifically, the method includes in particular a step consisting in listing the fallback paths of the helicopter and identifying that an undesirable event is imminent when the number of fallback paths drops below a third predetermined threshold value.

To do this, at each instant in flight, the computer 8 gives the crew a value that is representative of the current risk of the flight. The computer 8 then generates a safety score specific to each of the possible fallback paths 3, i.e. for each of the paths that enable the helicopter to avoid colliding with the ground and to pass obstacles and relief at a distance that is sufficiently safe. The thresholds taken into account by the computer 8 are parameters that can be adjusted depending on the mission being undertaken and depending on the preferences of the crew.

The facts that the risk score is quantified and that it is updated in real time do not necessarily mean that it is explicitly displayed for the crew. Nevertheless, under certain circumstances, scores as determined in this way by the computer 8 may be transmitted to the crew by means of a man-machine interface 9.

Risk diagnosis relies mainly on analyzing the environment that can be reached by the helicopter 1 in a given flight time, as revealed by a display of fallback paths 3, around the current position of the helicopter.

The computer 8 then generates all of the positions that can be reached in the short term by the helicopter 1, in the form of paths, e.g. for a period of 20 s to 30 s, and it does so in all spatial directions.

Thus, when the helicopter 1 approaches terrain in relief, the number of reachable positions decreases and certain fallback paths 3 are no longer possible. Specifically, the fallback paths 3 are projections of the positions that might possibly be reachable by the helicopter 1 in the future. Thus, they also represent the helicopter coming closer to the ground or to obstacles that may be stationary or moving.

In addition, such an approach may be represented progressively by height levels relative to the terrain in relief. For example, taking as a reference the current height of the flight, it is possible to consider that the helicopter 1 is safe providing it is at a minimum distance of 300 meters (m) from the ground, from the terrain in relief, or from stationary or moving obstacles.

In terms of safety/risk, this means that no spatial path that is reachable in the next 30 seconds of flight is situated at a distance of less than 300 m from terrain in relief. This reasoning may be reproduced in steps of 50 m, for example, so as to be able to deduce more effectively how the current flight situation becomes degraded.

Thus, as the helicopter flies towards terrain in relief, the paths discretizing the reachable space around the current flight point that would cause the helicopter to encounter the terrain in relief are thus either purely and simply eliminated by the computer 8, or else the computer 8 gives them a higher risk score as a function of the height levels at which they are located.

Furthermore, the overall risk also increases since the paths that are considered as being safe disappear progressively, thereby degrading the safety of the flight. The fallback paths 3 that are still safe are stored in a central database, and the most pertinent paths are proposed to the crew as alternatives to the current path. The paths that are less safe, because they are located at a distance of less than 300 m from terrain in relief are also stored, but they are given a lower ranking so that they are placed lower down the list of choices from the computer 8.

This reasoning makes it predictable that the fallback paths 3 will disappear progressively as a result of the number of fallback paths progressively disappearing, firstly as a result of their individual safety levels degrading, and subsequently as a result of increasing overall risk. It can thus be observed that a plurality of objective safety barriers are lost in succession during the flight. This parameter concerning height relative to terrain in relief may also be associated with other parameters, such as for example the level of stresses on the helicopter 1.

By way of example, the progress of a flight may begin at an instant $t_0$ corresponding to a safe position of the helicopter 1, i.e. when the helicopter is at an acceptable distance from terrain in relief. The level of risk is then an acceptable value, and all of the fallback paths 3 are at a distance of more than 300 m from the ground. A large number of fallback paths 3 are then possible.

At an instant $t=t_0+\delta T$, the helicopter 1 comes closer to facing terrain in relief, this terrain culminating at an altitude higher than the current altitude of the helicopter 1. The risk increases since the number of fallback paths suitable for avoiding the terrain decreases.

Furthermore, there are various ways in which it can be detected that terrain in relief is being approached.

As already mentioned, in a first embodiment, the safety system 4 may include a sensor 10 such as a radar for scanning the outside environment topographically. The data from the sensor 10 is then transmitted to the computer 8.

In a second embodiment, the safety system 4 may include a memory 11 suitable for storing a three-dimensional map of the zone being overflown. Data stored in the memory 11 is then constantly delivered to the computer 8 in order to enable it to generate fallback paths as a function of the terrain.

Finally, in a third embodiment, and as shown in FIG. 2, the safety system 4 may include both a sensor 10 as described above and a memory 11 suitable for storing a map of the zone being overflown.

The safety system 4 then uses the man-machine interface 9 to display a selection of fallback paths 3 to the crew. The computer 8 for performing this display does so using parameters that have previously been set by the crew. For example, the crew may prefer paths to be displayed that stress the helicopter 1 little, or they may prefer paths to be displayed that maintain some minimum distance relative to the terrain. These crew preferences can be modified during a mission.

Furthermore, as the helicopter 1 approaches terrain in relief head-on, the number of fallback paths 3 decreases uniformly until the moment when there are no longer any fallback paths 3 involving little stress. In other words, in order to avoid the terrain in the short term, the only fallback paths that remain involve high levels of stress compatible with the dynamic flight characteristics of the helicopter, such as in particular a solution consisting in stopping, which involves a path with a high degree of deceleration. If the helicopter 1 continues to advance as it was doing at said instant $t_0$, there will come a time when there are no longer any possible fallback paths 3 for the helicopter 1.

In the event that the pilot does not take a decision to avoid the terrain, it is envisaged that the safety system can take over from the pilot in order to make the flight safe. Such substitution of flight controls may consist in particular in causing the helicopter 1 to hover, i.e. to stop facing the terrain. Another solution may be to follow the preferred fallback path 3 as determined by the computer 8. In any event, the crew can take over from the safety system 4 immediately after it has performed the correcting action.

Having an image of the fallback paths 3 that can be performed by the helicopter 1 in the short term and having that image in real time, constitutes a considerable advantage. Not only does the crew have a display of fallback paths 3 that are alternatives to the current flight path, but such a safety system also serves to quantify the current risk at all stages of the flight.

As mentioned above, such a risk is a function of the capabilities specific to the helicopter and is determined while complying with the flight preferences of the crew in terms of safety, of flying comfort, and of the characteristics of the mission.

Furthermore, by having a physical representation of the positions that can be reached by the helicopter 1, genuine importance is given to the calculated current risk. Beyond an immediate safety level associated with the possible paths, the risk also serves to reveal the capability of the helicopter 1 to recover from the danger. For example, if the helicopter 1 can reach a certain number of positions at an instant $\underline{t}$ and if this number becomes degraded, it is possible to make an estimate of the chances of returning to an acceptable risk threshold. Such a helicopter thus possesses properties of resilience suitable for guaranteeing a stable level of safety for the helicopter.

Finally, when it is considered that impact against the terrain is inevitable or indeed when the number of fallback paths 3 is less than a first predetermined threshold value and the helicopter 1 has not been able to take over control from the crew, e.g. because the pilot has not authorized it to do so, it is possible to envisage that the safety system 4 includes an emergency member 12 suitable for issuing a warning signal. In this way, the nearest emergency services can be informed before the helicopter accident occurs. Emergency services can thus deploy the appropriate means for acting as quickly as possible.

Such an emergency member 12 may also turn emergency services towards the place of a crash as a function of the current risk and/or the envelope 2 of the last fallback paths 3 of the helicopter 1.

Likewise, the safety system 4 also has a control member 13 enabling corrective helicopter piloting actions to be taken automatically in order to limit the force of its impact against the ground. Such a control member 13 is then actuated when the number of fallback paths 3 for the helicopter 1 decreases and drops below a second predetermined threshold value.

Naturally, the parameters selected in this example, such as the minimum height of 300 m, or height stages of 50 m are merely illustrative and they may be varied either by crew preference or for safety reasons as defined by the manufacturer or by regulations.

Naturally, the present invention may be subjected to numerous variations as to its implementation. Although several embodiments are described, it can readily be understood that it is not conceivable to identify exhaustively all possible embodiments. It is naturally possible to envisage replacing any of the means described by equivalent means without going beyond the ambit of the present invention.

What is claimed is:

1. A safety system for minimizing the consequences of a helicopter suffering an accident while piloting the helicopter, wherein the safety system comprises:

a computer generating at any instant t a three-dimensional envelope of fallback paths for the helicopter, the three-dimensional envelope being obtained by calculating, at the instant t, a set of positions that can be reached by the helicopter during a predetermined flight duration, the computer having parameters previously set with data relating to the flight capabilities of the helicopter and including at least one of the following flight capabilities of the helicopter: maximum speeds and accelerations in all three spatial directions, higher order derivatives of at least one of the maximum speeds or accelerations in all three spatial directions, minimum turning radii for yaw movements, climbing or descending angles, maximum weight of the transported load, and maximum stresses;

the computer counting the fallback paths and comparing an amount of fallback paths to a first threshold value and to a second threshold value, wherein the second threshold value is less than or equal to the first threshold value;

an emergency member suitable for issuing a warning signal when the amount of the fallback paths is less than the first threshold value; and a control member suitable, when the amount of the fallback paths is less than the second threshold value, for implementing corrective helicopter piloting actions to minimize the consequences of the helicopter suffering an accident.

2. The safety system according to claim 1, wherein the fallback paths belong to at least two groups of paths corresponding to two distinct safety levels as pre-set by a pilot before a mission.

3. The safety system according to claim 1, wherein the computer identifies at least one preferred fallback path from the three-dimensional envelope of fallback paths, and wherein the safety system includes a man-machine interface enabling a pilot to select the preferred fallback path.

4. A helicopter, including a safety system according to claim 1.

5. A safety method seeking to minimize the consequences of a helicopter suffering an accident while piloting the helicopter, wherein the method comprises at least the steps of:

before a mission of the helicopter, setting parameters of a computer with data relating to the flight capabilities of the helicopter and including at least one of the following flight capabilities of the helicopter: maximum speeds in all three spatial directions, accelerations in all three spatial directions, higher order derivatives of at least one of the maximum speeds or accelerations in all three spatial directions, minimum turning radii for yaw movements, climbing or descending angles, maximum weight of the transported load, and maximum stresses;

calculating and generating, at any instant t, a three-dimensional envelope of fallback paths for the helicopter, the three-dimensional envelope being obtained by calculating, at the instant t, a set of positions that can be reached by the helicopter during a predetermined flight duration;

counting the fallback paths for the helicopter and detecting that an amount of the fallback paths is zero;

determining that an undesirable event is imminent as the amount of the fallback paths is less than a third predetermined threshold value greater than zero;

issuing a warning signal as the amount of the fallback paths is less than a first predetermined threshold value greater than zero; and in response to the amount of the fallback paths being zero:
inhibiting piloting commands from at least one of a manual piloting member and an automatic piloting member of the helicopter; and
generating and transmitting new helicopter piloting commands, the new helicopter piloting commands serving to perform corrective actions to minimize the consequences of the helicopter suffering an accident.

6. The method according to claim 5, wherein the fallback paths are generated so that they belong to at least two groups of paths corresponding to two distinct safety levels pre-set by a pilot before a mission.

7. The method according to claim 5, wherein the method includes the steps of:
identifying at least one preferred fallback path within the three-dimensional envelope of fallback paths; and
using a man-machine interface to give a pilot an option of selecting the preferred fallback path when an undesirable event is detected.

8. The method according to claim 7, wherein in the absence of the pilot of the helicopter selecting the preferred fallback path, the method includes a step of automatically following the preferred fallback path.

9. The method according to claim 5, wherein prior to a helicopter mission, the safety method includes a step of supplying a computer with parameters specific to the flight conditions of the helicopter, the parameters being selected from the group consisting of: a weight of the load transported by the helicopter, a position of its center of gravity, and flight endurance of the helicopter.

10. The method according to claim 5, wherein prior to a helicopter mission, the safety method includes a step of transmitting piloting preferences to a computer for use in the situation in which the undesirable event has been identified, the preferences being selected from the group consisting of: a dynamic stress limit of the helicopter, proximity to terrain in relief, proximity to stationary obstacles, proximity to moving obstacles, a limit on changes of direction in a short period of time, and departure from an initial route.

11. The method according to claim 5, wherein the safety method includes a step of transmitting data to a computer, which data comes from a sensor suitable for reconstituting a three-dimensional image of the outside environment.

12. The method according to claim 5, wherein the safety method includes a step of transmitting data to a computer, which data comes from a database stored in a memory, the data consisting of a three-dimensional map of the outside environment.

13. A safety method seeking to minimize the consequences of a helicopter suffering an accident while piloting the helicopter, the method comprising:

before a mission of the helicopter, setting parameters of a computer with data relating to the flight capabilities of the helicopter and including at least one of the following flight capabilities of the helicopter: maximum speeds in all three spatial directions, accelerations in all three spatial directions, higher order derivatives of at least one of the maximum speeds or accelerations in all three spatial directions, minimum turning radii for yaw movements, climbing or descending angles, maximum weight of the transported load, and maximum stresses;

calculating and generating, by the computer, at any instant t, a three-dimensional envelope of fallback paths for the helicopter, the three-dimensional envelope being obtained by calculating, at the instant t, a set of positions that can be reached by the helicopter during a predetermined flight duration from a current position of the helicopter at the instant t;

counting, by the computer, the fallback paths and detecting, by the computer, that an amount of the fallback paths is less than a second threshold value, wherein the second threshold value is less than the first threshold value;

issuing a warning signal, by an emergency member, as the amount of the fallback paths is less than the first threshold value; and implementing corrective helicopter piloting actions, by a control member, to minimize the consequences of the helicopter suffering an accident as the amount of the fallback paths is less than the second threshold value.

14. The method according to claim 13 wherein the amount of the fallback paths is zero, the method further comprising:
in response to the amount of the fallback paths being zero,
inhibiting piloting commands from at least one of a manual piloting member and an automatic piloting member of the helicopter; and
generating and transmitting new helicopter piloting commands, the new helicopter piloting commands serving to perform corrective actions to minimize the consequences of the helicopter suffering an accident.

15. The method according to claim 13, wherein the fallback paths are generated so that they belong to at least two groups of paths corresponding to two distinct safety levels pre-set by a pilot before a mission.

16. The method according to claim 13, further comprising:
identifying, by the computer, at least one preferred fallback path from the three-dimensional envelope of fallback paths; and
using a man-machine interface to enable a pilot to select the preferred fallback path.

17. The method according to claim 16, further comprising:
in the absence of the pilot selecting the preferred fallback path when an undesirable event is detected, automatically following the preferred fallback path.

18. The method according to claim 13, further comprising:
transmitting sensor data of a sensor to the computer, wherein the sensor data for reconstituting a three-dimensional image of the outside environment.

19. The method according to claim 13, further comprising:
transmitting database data from a database to the computer, wherein the database data consists of a three-dimensional map of the outside environment.

20. The method of claim 13 further comprising:
- detecting, by the computer, that the amount of the fallback paths is less than a third threshold value, wherein the third threshold value is less than the second threshold value; and
- determining, by the computer, that an undesirable event is imminent as the amount of the fallback paths is less than the third threshold value.

\* \* \* \* \*